US009726899B2

(12) United States Patent
Kim et al.

(10) Patent No.: US 9,726,899 B2
(45) Date of Patent: *Aug. 8, 2017

(54) CAMERA LENS MODULE

(71) Applicant: JAHWA electronics Co., Ltd., chungcheongbuk-do (KR)

(72) Inventors: Hee Seung Kim, Seoul (KR); In Soo Kim, Gyeonggi-do (KR); Noh Yo Han, Daegu (KR)

(73) Assignee: JAHWA electronics Co., Ltd., Cheongju-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/341,243

(22) Filed: Nov. 2, 2016

(65) Prior Publication Data
US 2017/0052388 A1 Feb. 23, 2017

Related U.S. Application Data

(62) Division of application No. 14/609,039, filed on Jan. 29, 2015, now Pat. No. 9,549,109.

(30) Foreign Application Priority Data

Mar. 7, 2014 (KR) .................... 10-2014-0027013

(51) Int. Cl.
*G02B 27/64* (2006.01)
*G03B 13/36* (2006.01)
(Continued)

(52) U.S. Cl.
CPC .......... *G02B 27/646* (2013.01); *G02B 5/208* (2013.01); *G02B 7/006* (2013.01); *G02B 7/08* (2013.01);
(Continued)

(58) Field of Classification Search
CPC ............ H04N 5/2254; H04N 5/23212; H04N 5/23264; H04N 5/2253; H04N 5/23248;
(Continued)

(56) References Cited

U.S. PATENT DOCUMENTS 9,319,574 B2 * 4/2016 Shin ...................... H04N 5/2254
9,420,183 B2 * 8/2016 Hwang ................ G02B 27/646
(Continued)

FOREIGN PATENT DOCUMENTS

JP 2009-229789 A 8/2009
JP 2010-096860 A 4/2010
(Continued)

OTHER PUBLICATIONS

International Search Report dated Mar. 20, 2015 in corresponding Application No. PCT/EP2015/050911; 2 pgs.

*Primary Examiner* — Pritham Prabhakher
(74) *Attorney, Agent, or Firm* — Maier & Maier, PLLC

(57) ABSTRACT

A camera lens module according to an embodiment of the present invention is configured to include an optical image stabilizing carrier configured to accommodate a lens barrel and driven by an optical image stabilizer driving unit; a rolling unit configured to support a plane motion of the optical image stabilizing carrier to be orthogonal to an optical axis; an autofocus carrier configured to mount the optical image stabilizing carrier to advance and retreat along the optical axis at a side opposite to the optical image stabilizing carrier; a base including side surfaces configured to wrap the autofocus carrier and the optical image stabilizing carrier, wherein the optical image stabilizer driving unit is placed between the base and the optical image stabilizing carrier and an autofocus driving unit for driving the autofocus carrier is placed between the autofocus carrier and the base.

5 Claims, 9 Drawing Sheets

(51) Int. Cl.

| | | |
|---|---|---|
| *H04N 5/225* | (2006.01) | |
| *H04N 5/232* | (2006.01) | |
| *G03B 3/10* | (2006.01) | |
| *G03B 5/00* | (2006.01) | |
| *G02B 5/20* | (2006.01) | |
| *G02B 7/00* | (2006.01) | |
| *G02B 7/08* | (2006.01) | |
| *G02B 7/09* | (2006.01) | |
| *G03B 5/04* | (2006.01) | |

(52) U.S. Cl.
CPC .............. *G02B 7/09* (2013.01); *G03B 3/10* (2013.01); *G03B 5/00* (2013.01); *G03B 5/04* (2013.01); *G03B 13/36* (2013.01); *H04N 5/2253* (2013.01); *H04N 5/2254* (2013.01); *H04N 5/2257* (2013.01); *H04N 5/23264* (2013.01); *G03B 2205/0007* (2013.01); *G03B 2205/0015* (2013.01); *G03B 2205/0053* (2013.01); *G03B 2205/0069* (2013.01); *H04N 5/2328* (2013.01); *H04N 5/23212* (2013.01)

(58) Field of Classification Search
CPC .......... H04N 5/23258; H04N 5/23287; G03B 13/36; G02B 27/646; G02B 13/001; G02B 5/208; G02B 7/006; G02B 7/08; H05K 1/148; H05K 2201/2009; H05K 2201/10287; H05K 2201/10977; H05K 3/3405
USPC .................................. 348/208.12
See application file for complete search history.

(56) References Cited

U.S. PATENT DOCUMENTS

| | | | |
|---|---|---|---|
| 2005/0276172 A1 | 12/2005 | Tsutsumi | |
| 2010/0290769 A1* | 11/2010 | Nasiri | G03B 17/00 396/55 |
| 2011/0013283 A1 | 1/2011 | Sato | |
| 2011/0106936 A1* | 5/2011 | Galbreath | H04L 43/028 709/224 |
| 2011/0211821 A1* | 9/2011 | Park | G03B 5/02 396/55 |
| 2011/0236008 A1* | 9/2011 | Kang | G03B 3/10 396/133 |
| 2012/0229901 A1* | 9/2012 | Moriya | G03B 3/10 359/557 |
| 2013/0016427 A1* | 1/2013 | Sugawara | G02B 7/08 359/557 |
| 2013/0050828 A1* | 2/2013 | Sato | G02B 27/64 359/557 |
| 2013/0088607 A1 | 4/2013 | Akutsu | |
| 2013/0128360 A1 | 5/2013 | Minamisawa | |
| 2013/0162851 A1* | 6/2013 | Shikama | G03B 5/00 348/208.99 |
| 2013/0163974 A1 | 6/2013 | Takei | |
| 2013/0215284 A1 | 8/2013 | Wade | |
| 2014/0009631 A1 | 1/2014 | Topliss | |
| 2014/0160311 A1* | 6/2014 | Hwang | G02B 27/646 348/208.99 |
| 2014/0355118 A1* | 12/2014 | Park | G02B 27/646 359/557 |
| 2014/0362284 A1* | 12/2014 | Shin | H04N 5/2254 348/373 |

FOREIGN PATENT DOCUMENTS

| | | |
|---|---|---|
| JP | 2011-203283 A | 10/2011 |
| KR | 20-1999-0015015 Y1 | 5/1999 |
| KR | 10-2009-0008566 A | 1/2009 |
| KR | 10-0880672 B1 | 2/2009 |
| KR | 10-2011-0046855 A | 5/2011 |
| KR | 10-1204587 B1 | 11/2012 |
| KR | 10-2013-0044438 A | 5/2013 |

* cited by examiner

Cross-sectional view
taken along the line A-A

CAMERA LENS MODULE

BACKGROUND OF THE INVENTION

Field of the Invention

The present invention relates to a camera lens module mounted on a portable mobile device, and more specifically, to a camera lens module equipped with an optical image stabilizer and an autofocus.

Background of the Related Art

A portable terminal such as a latest smart phone (hereinafter, referred to as a 'mobile') becomes multi-convergence as music, movies, a TV receiver, games and the like, as well as a simple telephone function, are mounted along with advancement of its technology, and one of factors leading to development of the multi-convergence is a camera lens module.

The camera lens module mounted on the mobile is changed to a structure equipped with a variety of additional functions such as an autofocus (AF), an optical zoom and the like to catch up with recent changes focusing on high pixel and high functionality in response to user requirements. Particularly, attempts of implementing an optical image stabilizer in a mobile size are progressed from various aspects recently.

An optical image stabilizer technique is a technique of maintaining optimum resolution of a photographed image by automatically controlling the focus of a correcting lens configuring a camera module to move in a direction corresponding to a hand tremor. An optical image stabilizing actuator for adjusting the focus is mounted on the camera module applied to a mobile, a camcorder or the like to implement the optical image stabilizer technique.

An optical image stabilizing actuator of a Voice Coil Motor (VCM) type using the interaction between a magnetic field and an electric field is well known. The VCM type actuator generally includes a magnetic circuit configured of a coil and a magnetic material arranged to face each other and performs a correction corresponding to a tremor through plane movement of a mover having a lens installed therein with respect to a stator by using an electromagnetic force generated by the magnetic circuit.

Generally, a method of applying two pairs of magnetic circuits facing in two axis directions, i.e., four magnetic circuits in total, is employed so that the correction may be performed by moving the mover in the X and Y two axis directions. However, a size of the camera module generally increases and configuration of the device is complicated since a space is needed as much as to apply the four magnetic circuits, and thus it is difficult to achieve miniaturization of a product.

If the size or the number of parts of the mover is reduced for miniaturization of the module, there is a problem in that preciseness and promptness of the optical image stabilizer are lowered, and, particularly, since the mover is driven beyond a driving range in performing optical image stabilization by using a resultant force of orthogonal forces applied in the X and Y two axis directions or unnecessary rotation occurs when the mover is driven, accuracy of the correction is lowered.

SUMMARY OF THE INVENTION

Therefore, the present invention has been made in view of the above problems, and it is an object of the present invention to provide a camera lens module, which can achieve miniaturization of a product through a compact structure and, at the same time, stably and accurately drive and control an optical image stabilizer.

Another object of the present invention is to implement a camera lens module equipped with an optical image stabilizer of high accuracy and preciseness by suppressing movement of a mover exceeding a driving range and unnecessary rotation of the mover in performing optical image stabilization.

To accomplish the above objects, according to one aspect of the present invention, there is provided a camera lens module including: an optical image stabilizing carrier configured to accommodate a lens barrel and driven by an optical image stabilizer driving unit; a rolling unit configured to support a plane motion of the optical image stabilizing carrier to be orthogonal to an optical axis; an autofocus carrier configured to mount the optical image stabilizing carrier to advance and retreat along the optical axis at a side opposite to the optical image stabilizing carrier; a base including side surfaces configured to wrap the autofocus carrier and the optical image stabilizing carrier, wherein the optical image stabilizer driving unit is placed between the base and the optical image stabilizing carrier and an autofocus driving unit for driving the autofocus carrier is placed between the autofocus carrier and the base.

In addition, the autofocus driving unit of the present disclosure may include: an autofocus magnet installed on an outer surface of the autofocus carrier; and an autofocus coil installed at the base to face the autofocus magnet.

The optical image stabilizer driving unit of the present disclosure may include: an coil installed on the base; and a magnet installed on the optical image stabilizing carrier to face the coil.

In addition, the autofocus driving unit of the present disclosure may include: optical axis guide devices respectively including a ball and arranged at the base corresponding to both left and right sides of the autofocus magnet; and a back yoke arranged on a rear side of the autofocus magnet.

Further, wherein the rolling unit of the present disclosure may include: two or more balls placed between the optical image stabilizing carrier and the autofocus carrier to support the optical image stabilizing carrier so that the optical image stabilizing carrier rolls in a direction vertical to the optical axis.

In addition, the rolling unit of the present disclosure further may include: two or more supporting pieces respectively provided at a corner of the autofocus carrier in one piece and having a concave accommodating surface formed on a top surface thereof; two or more seating pieces formed on a circumference of the optical image stabilizing carrier in a projected form to be correspondent to the supporting pieces and respectively having a concave accommodating surface formed on a bottom surface thereof; and wherein the balls are interposed between the supporting piece and the seating piece so that a portion and another portion of the balls are respectively accommodated on the accommodating surfaces of the supporting piece and the seating piece.

Further, the supporting piece and the seating piece may be arranged to be vertically stacked in an optical axis direction to form a single shake suppressing piece, and two or more concave surfaces shaped so that the shake suppressing piece is inserted therein are provided along the optical axis direction inside a corner of the base.

In addition, the camera lens module of the present disclosure may further include: an image sensor module mounted on a bottom of the base, wherein the image sensor module may include: an infrared filter arranged at a center of an opening of the bottom unit of the base; a filter base on which the infrared filter is installed; and a substrate arranged under the infrared filter and having an image sensor installed thereto.

DETAILED DESCRIPTION OF THE PREFERRED EMBODIMENT

The preferred embodiment of the present invention will be hereafter described in detail, with reference to the accompanying drawings. In describing the present invention, if already known functions or specific descriptions of constitutions related to the present invention may make the spirit of the present invention unclear, detailed descriptions thereof will be omitted.

For the convenience of explanation, it will be described using a three-axis direction coordinate system, and in describing the figures, the Z-axis is defined as an optical axis direction, the X-axis is defined as an optical image stabilization direction orthogonal to the Z-axis optical axis direction, and the Y-axis is defined as another optical image stabilization direction orthogonal to the X-axis on the same plane.

Figure 1:
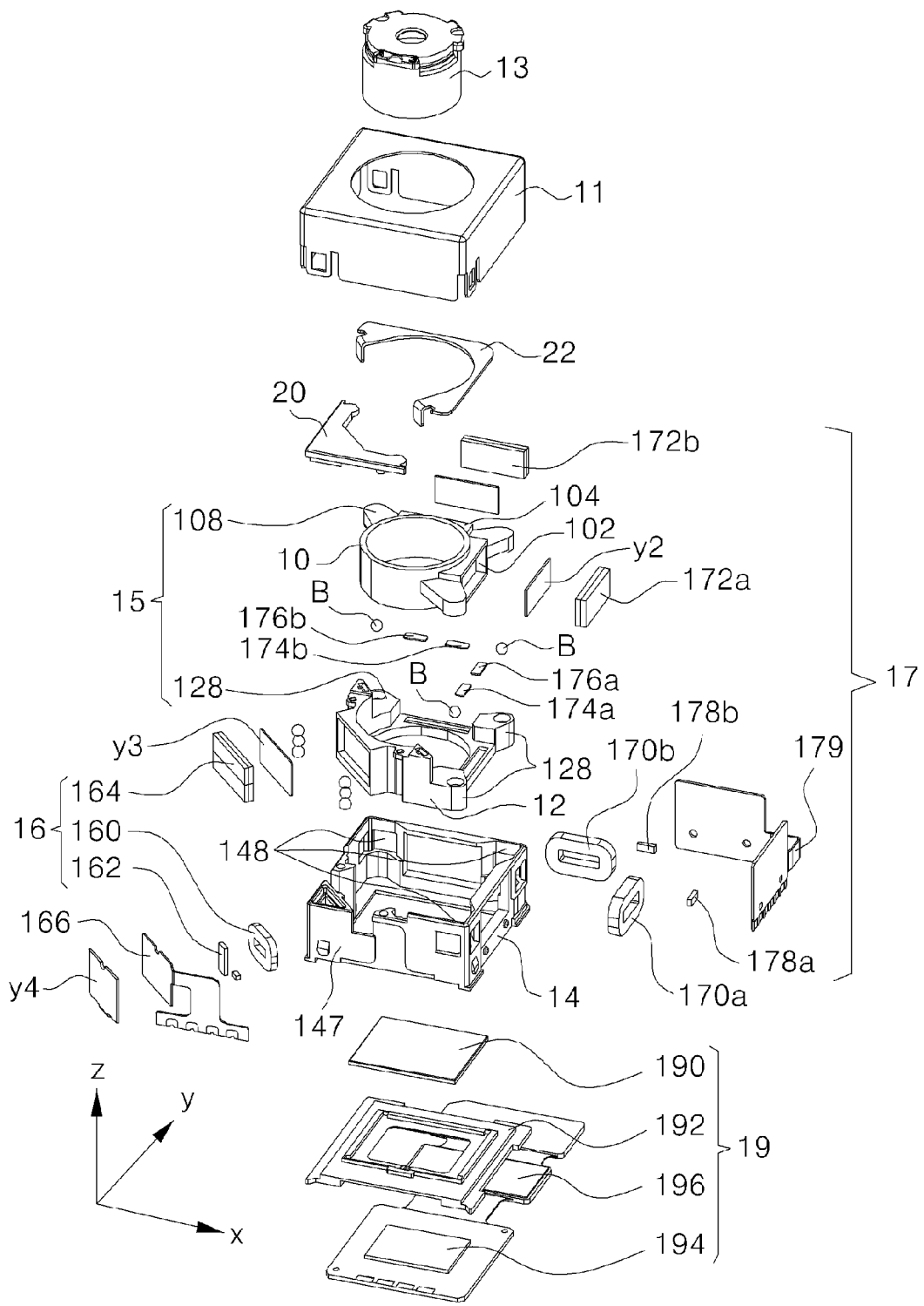
FIG. 1 is an exploded perspective view showing a camera lens module according to an embodiment of the present invention.
Figure 2:
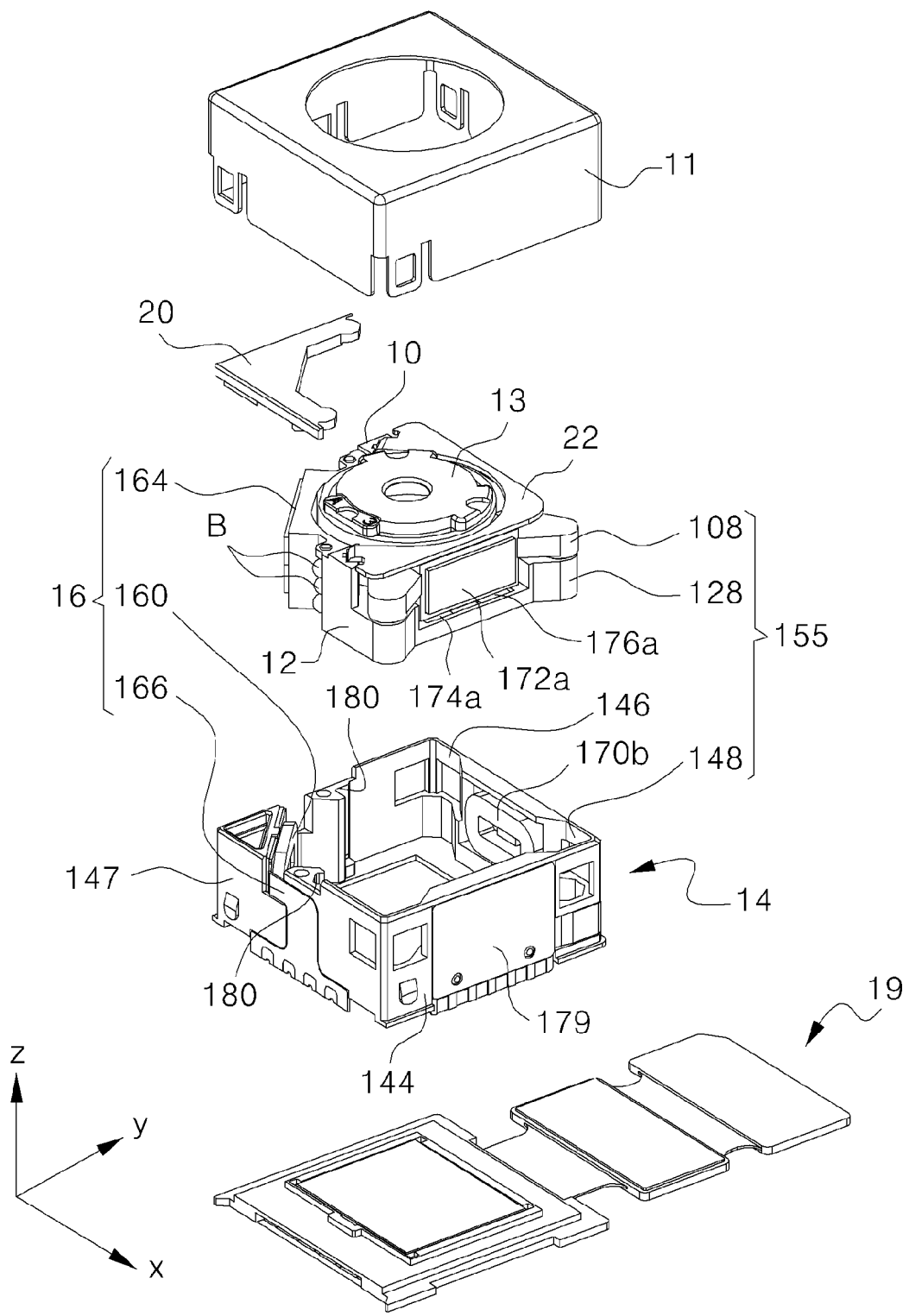
FIG. 2 is a partially exploded perspective view showing a camera lens module according to an embodiment of the present invention.
Figure 3:
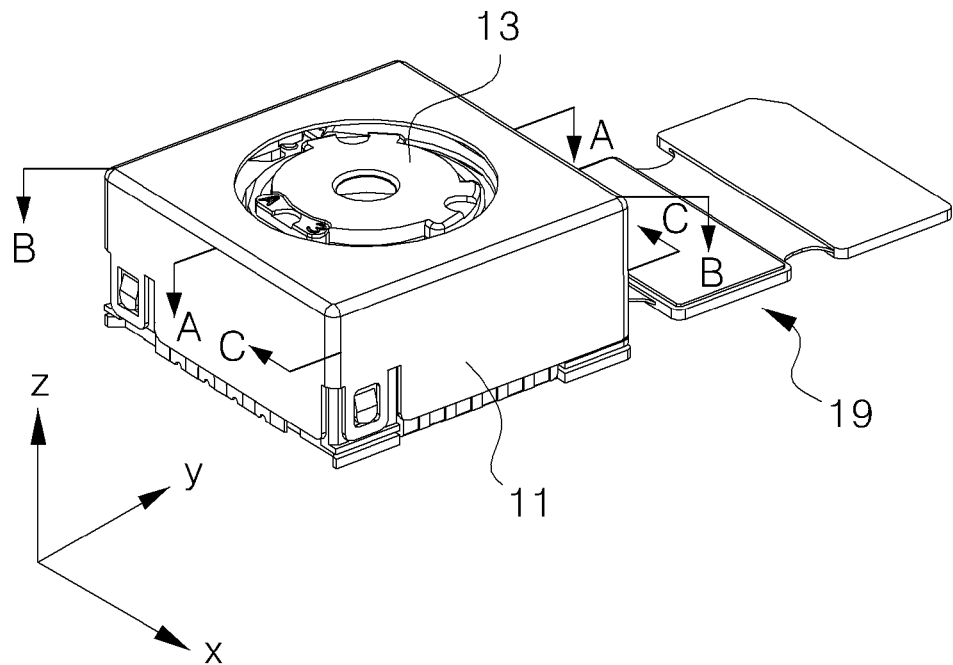
FIG. 3 is a combined perspective view showing a camera lens module according to an embodiment of the present invention.
Figure 4:
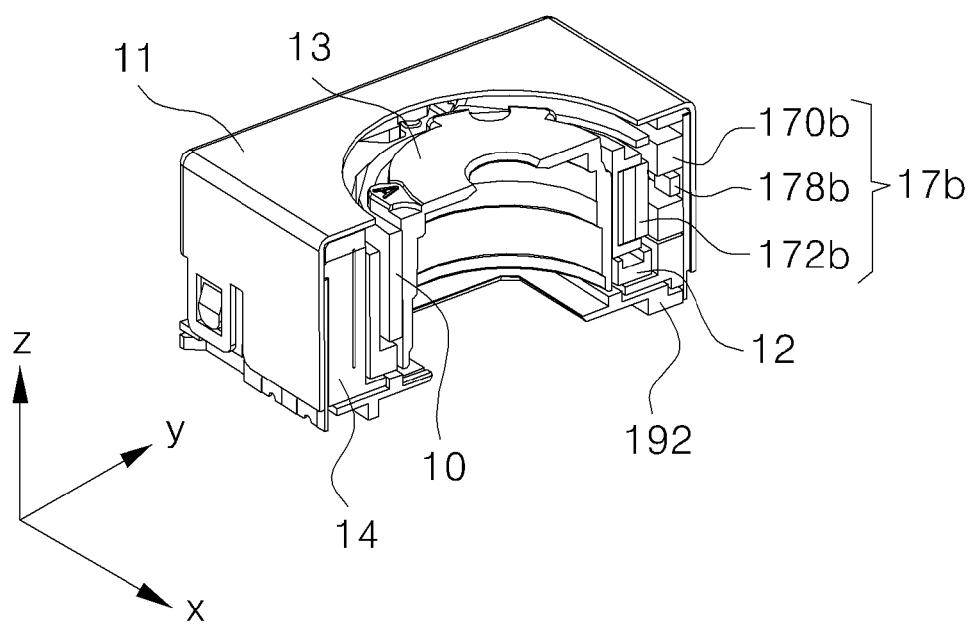
FIG. 4 is an incised perspective view showing the camera lens module of FIG. 3 from the direction of line A-A.
Figure 5:
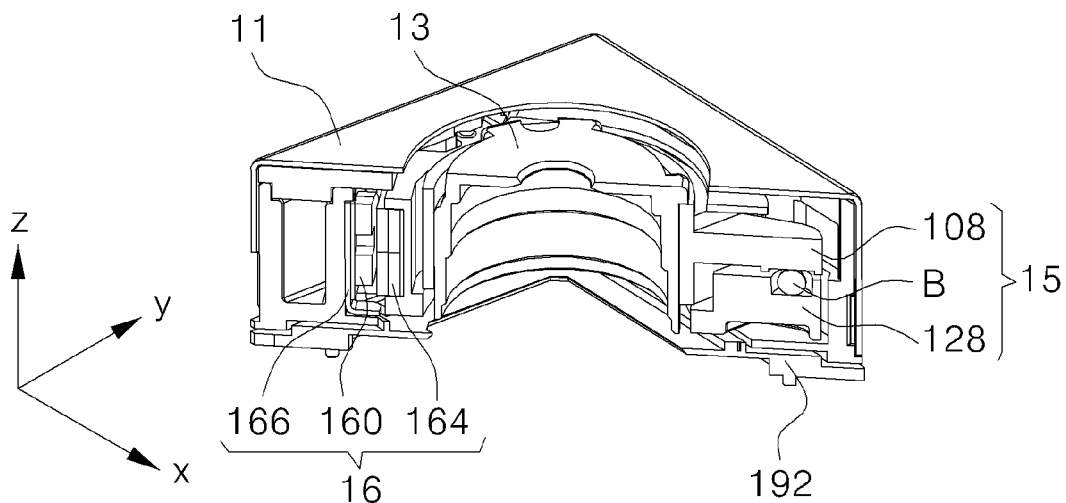
FIG. 5 is an incised perspective view showing the camera lens module of FIG. 3 from the direction of line B-B.
Figure 6:
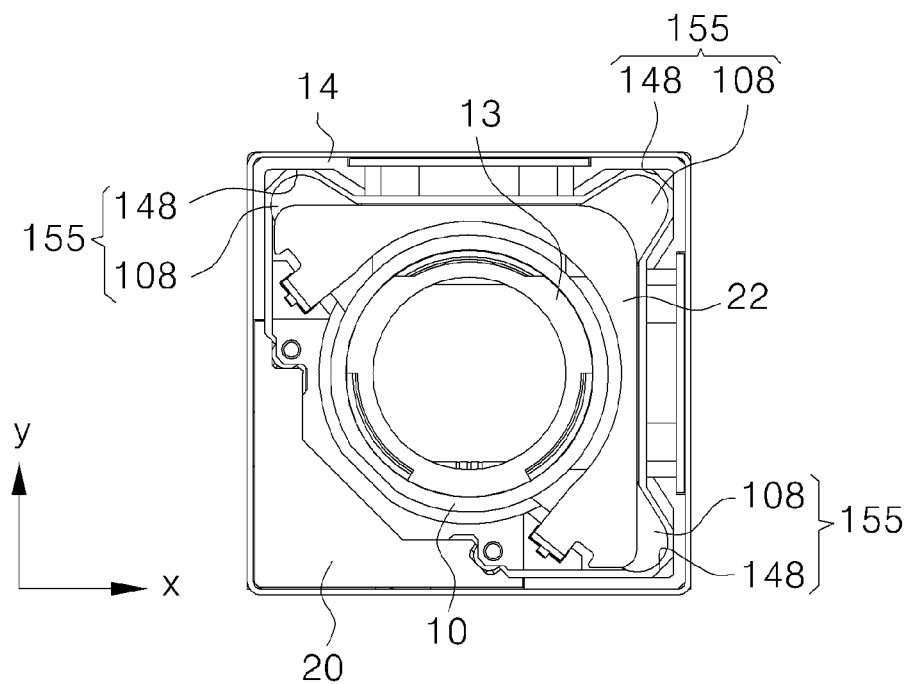
FIG. 6 is a plan view showing a camera lens module without a cover.
Figure 7:
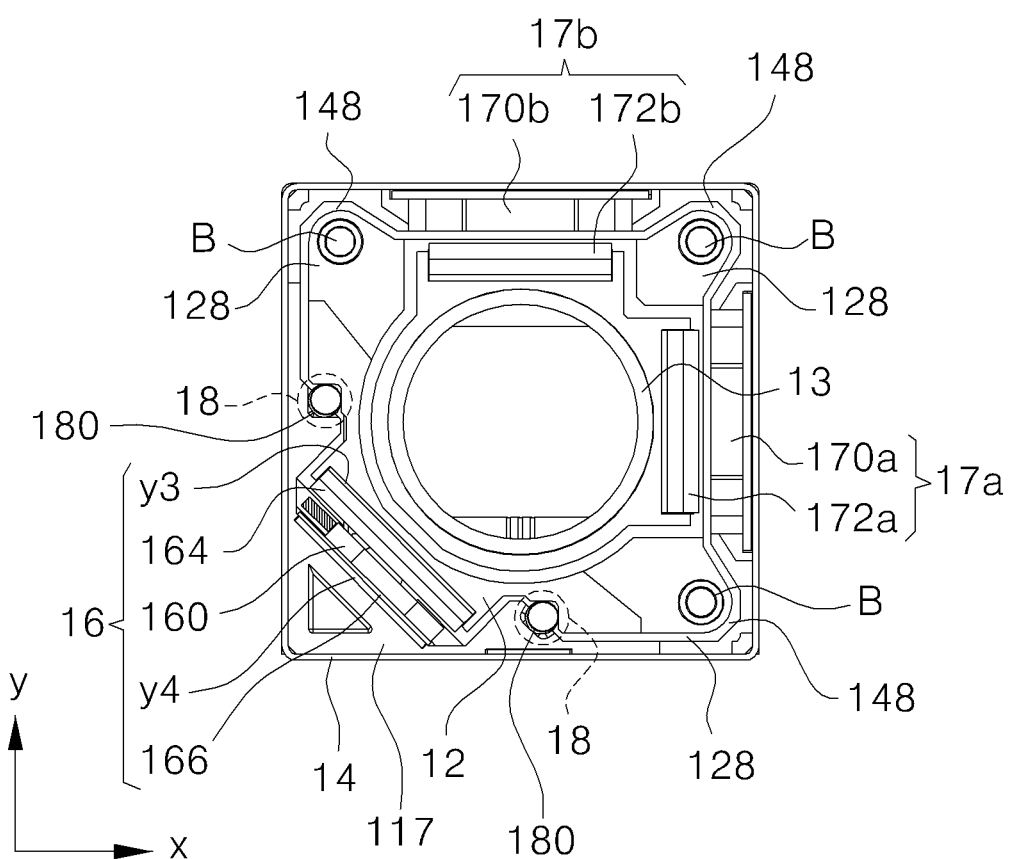
FIG. 7 is a flat cross-sectional view showing the camera lens module of FIG. 3 from the direction of line C-C.

FIGS. 1, 2 and 3 are respectively an exploded perspective view, a partially exploded perspective view and a combined perspective view respectively showing a camera lens module according to an embodiment of the present invention, and FIGS. 4 and 5 are incised perspective views showing the camera lens module of FIG. 3 from the directions of line A-A and line B-B. In addition, FIG. 6 is a plan view showing a camera lens module without a cover, and FIG. 7 is a flat cross-sectional view showing the camera lens module of FIG. 3 from the direction of line C-C.

Referring to FIGS. 1 to 7, a camera lens module according to an embodiment of the present invention includes a an optical image stabilizing carrier 10 for accommodating a lens barrel 13 and an autofocus carrier 12 for resting the optical image stabilizing carrier 10. The autofocus carrier 12 having the optical image stabilizing carrier 10 mounted thereon is accommodated in a base 14 to be advanced and retreated along the optical axis direction of a lens, and a cover 11 covers the base 14 which accommodates the carriers 10 and 12 from the top.

The optical image stabilizing carrier 10 is rested on the autofocus carrier 12 to be movable in the X and Y two axis directions on a plane orthogonal to the optical axis, and a rolling unit 15 is provided between the autofocus carrier 12 and the optical image stabilizing carrier 10 to support stable plane motion orthogonal to the optical axis of the optical image stabilizing carrier 10 with respect to the autofocus carrier 12, i.e., to support a drive for optical image stabilization.

When the autofocus carrier 12 on which the optical image stabilizing carrier 10 is rested is seen from the top, it is roughly formed in a shape removing one corner from a rectangular shape having four corners.

A lens group (not shown) configured of a plurality of lenses is installed in the lens barrel 13, and a hole (not shown) having a diameter as large as to stably accommodate the lens barrel 13 is provided in the optical image stabilizing carrier 10. In addition, the base 14 is configured of a bottom unit 140 wrapping the lower surface of the autofocus carrier 12 and side surface units 142 of a rectangular shape wrapping the outer surfaces of the carriers 10 and 12.

An opening in which an infrared filter 190 configuring an image sensor module 19 will be placed is formed at the center of the bottom unit 140 of the base 14 wrapping the lower surface of the carrier. In addition, a filter base 192 in which the infrared filter 190 is installed is assembled on the bottom surface of the bottom unit 140 under the opening, and a substrate 196 installed with an image sensor 194 is assembled on the bottom surface of the filter base 192, and, here, the substrate 196 may be a flexible substrate.

The optical image stabilizing carrier 10 accommodating the lens barrel 13 is provided in a cylindrical shape, and the base 14 is provided in a hexahedral shape. Accordingly, if the optical image stabilizing carrier 10 is accommodated in the base 14, four free spaces are generated at the corner areas of the base 14, and an autofocus driving unit 16 and a shake limiting unit 155 which will be described below are arranged for efficient installation of parts and miniaturization of a product through effective utilization of the free spaces.

If a portion of the optical image stabilizing carrier 10 provided in a cylindrical shape is cut in the optical axis direction, a good assemblability can be secured since elastic expansion is allowed within a predetermined range although a machining tolerance exists between the outer diameter of the lens barrel 13 and the inner diameter of the optical image stabilizing carrier 10 (e.g., when the outer diameter of the lens barrel is larger than the inner diameter of the optical image stabilizing carrier), and there may be a modification of securing a space for installing parts by removing a portion of the bottom.

The autofocus driving unit 16 is arranged in a free space of any one of the corner areas among the four free spaces and generates a driving force for moving the autofocus carrier 12 in the optical axis direction, and shake limiting units 155 are arranged in the other three free spaces to prevent deviation of the carriers 10 and 12 in which the lens barrel 13 is installed from the optical axis alignment position when an external shock is applied.

The autofocus driving unit 16 includes an autofocus coil 160 installed at a corner opposite to a corner where a first side surface 144 and a second side surface 146 of the base 14 in which a portion of the configuration of an optical image stabilizer driving unit 17 described below is installed are orthogonal to each other, a driver 162 arranged on an adjacent lateral side of the coil, and an autofocus magnet 164 installed in a magnet installation unit of the outer surface of the autofocus carrier 12 facing the autofocus coil 160.

Since the driver 162 may be provided in a form mounted outside the camera lens module (in a form of a mobile device on which the camera lens module is mounted) in some cases, it can be omitted, and, in this case, an autofocus control sensor for sensing change of position of the autofocus carrier 12 with respect to the base when autofocus is driven may be arranged inside or on an adjacent lateral side of the autofocus coil 160.

A pair of optical axis guide devices 18 of a well-known form including a ball B (details thereof are omitted) are arranged on both left and right sides of the autofocus magnet 164 and in the corner areas of the base 14 corresponding thereto to guide optical axis movement of the autofocus carrier 12 with respect to the base 14, and a back yoke y3 is arranged on the rear surface of the autofocus magnet 164 to improve driving efficiency by concentrating electromagnetic fields generated by the autofocus coil 160 and a magnet.

In configuring the optical axis guide device 18, it is preferable to configure guide surfaces of guide members 180, which are formed on both side surfaces of the base 14 to be orthogonal to each other with the intervention of an installation unit 147 installed at a corner of the base 14 in which some of the configurations (the autofocus coil) configuring the autofocus driving unit 16 are installed, in an asymmetrical structure (a guide surface on one side has a V-shaped cross section, and a guide surface on the other side has a U-shaped cross section) as shown in FIG. 7 so that advancing/retreating movement may be smoothly performed in the optical axis direction.

Since the autofocus coil 160 receives power from a substrate 166 arranged behind thereof and generates an electric field, the autofocus carrier 12 is guided by the pair of guide devices 18 inside the base 14 by a force (Lorentz force) generated from the electric field generated by the autofocus coil 160 and a magnetic field generated by the autofocus magnet 164 and performs steady and stable advancing/retreating movement along the optical axis.

Hereinafter, the rolling unit which supports stable driving of the autofocus for optical image stabilization is described with reference to FIG. 8.

Figure 8:
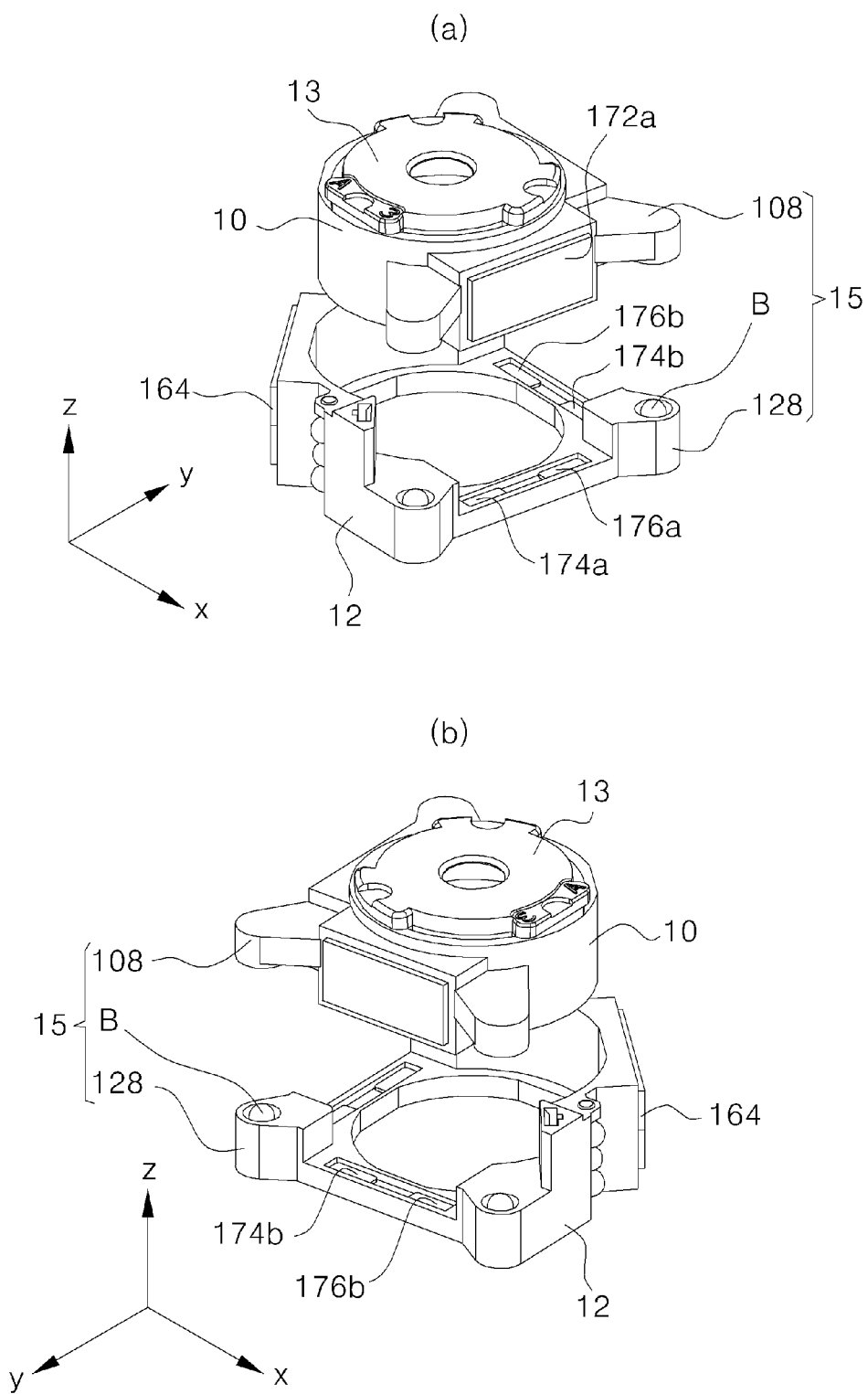
FIG. 8 is a perspective view showing a state before combining an optical image stabilizing carrier and an autofocus carrier configuring a camera lens module according to an embodiment of the present invention.

Referring to FIG. 8, the rolling unit 15 includes two or more supporting pieces 128 respectively provided at each corner of the autofocus carrier 12 in one piece and having a concave accommodating surface formed on the top surface, two or more seating pieces 108 formed on the circumference of the optical image stabilizing carrier 10 in a projected form to be correspondent to the supporting pieces 128 and respectively having a concave accommodating surface formed on the bottom surface, and two or more balls B respectively interposed between the supporting piece 128 and the seating piece 108.

Specifically, the supporting pieces 128 are formed at both side corners adjacent to the magnet installation unit arranged at one corner of the base 14 in the form of a diagonal line and at a corner opposed in the diagonal direction, and the seating pieces 108 are integrally formed on the circumferential surface of the optical image stabilizing carrier 10 in a form one-to-one corresponding to the supporting pieces 128. In addition, the ball B is interposed in a form in which a portion and the other portion thereof are respectively accommodated on the accommodating surfaces of the supporting piece 128 and the seating piece 108.

The supporting piece 128 and the seating piece 108 are vertically arranged with respect to the optical axis direction after being assembled to form a shake suppressing piece, and two or more concave surface units 148 of a form capable of inserting the shake suppressing piece are respectively provided along the optical axis direction inside the corner of the base 14 corresponding to the shake suppressing piece, and thus the shake suppressing pieces 108 and 128 and the concave surface unit 148 configure the shake limiting unit 155 described above.

Since autofocus control or optical image stabilization is achieved or excessive shaking or deviation of the carriers 10 and 12 with respect to the base 14 is suppressed by the supporting pieces 128, the seating pieces 108 and the shake limiting unit 155 configured by the concave surface unit 148 when an inner or outer shock is applied to the camera lens module, shock resistance and reliability can be increased.

In addition, a mounting unit 102 is assembled to be engaged between the supporting pieces 128 in a form of facing a side surface of each supporting piece 128 projected from the bottom side of the autofocus carrier 12 with a side surface of the mounting unit 102 of the optical image stabilizing carrier 10 described below with the intervention of a predetermined gap, and thus, in the same manner as described above, excessive shaking or deviation of the optical image stabilizing carrier 10 with respect to the autofocus carrier 12 is suppressed when an inner or outer shock is applied.

The optical image stabilizer driving unit 17 which generates a force for performing a plane motion on the XY plane of the optical image stabilizing carrier 10 with respect to the autofocus carrier 12 is arranged on the other side of the autofocus driving unit 16 so that a proper correction corresponding to a hand tremor may be achieved. Hereinafter, the optical image stabilizer driving unit 17 will be described with reference to FIG. 9 and previously attached FIG. 8.

Figure 9:
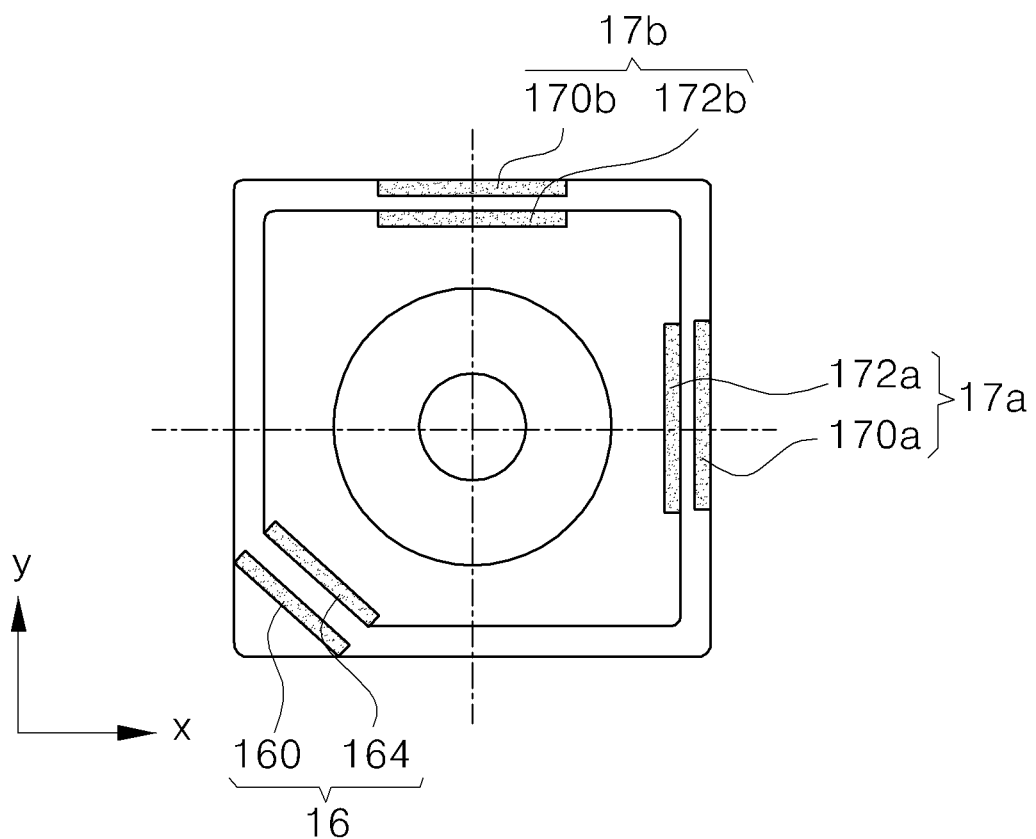
FIG. 9 is a flat schematic view of a camera lens module according to an embodiment of the present invention, showing an arrangement relation between an autofocus driving unit and an optical image stabilizing drive.

FIG. 9 is a view schematically showing an arrangement relation between an autofocus driving unit and an optical image stabilizer driving unit.

Referring to FIGS. 8 and 9, the optical image stabilizer driving unit 17 is configured of coils 170a and 170b and magnets 172a and 172b respectively installed on the side surfaces of the base 14 on both sides of a corner opposite, in the diagonal direction, to a corner of the base 14 in which the autofocus coil 160 is installed (referred to as a first side surface 144 and a second side surface 146 for the convenience of explanation) and on the outer surface of the optical image stabilizing carrier 10 facing the side surfaces.

In addition, the optical image stabilizer driving unit 17 includes yokes 174a, 176a, 174b and 176b arranged between the carriers 10 and 12 to be correspondent to the magnets 172a and 172b.

Specifically, the optical image stabilizer driving unit 17 may be divided into a first optical image stabilizer driving unit 17a arranged between the first side surface 144 of the base 14 and the optical image stabilizing carrier 10 to generated a force for moving the optical image stabilizing carrier 10 in the X-axis direction and a second optical image stabilizer driving unit 17b arranged between the second side surface 146 of the base 14 orthogonal to the first side surface 144 and the optical image stabilizing carrier 10 to generated a force for moving the optical image stabilizing carrier 10 in the Y-axis direction.

A proper correction corresponding to a hand tremor is made as the optical image stabilizing carrier 10 performs a plane motion in a direction to which a resultant force is applied on the XY plane of the autofocus carrier 12 by a vector force (the resultant force) of a component of an X-axis direction force generated by the first optical image stabilizer driving unit 17a and a Y-axis direction force generated by the second optical image stabilizer driving unit 17b.

Specifically, the first optical image stabilizer driving unit 17a includes a first coil 170a installed on the first side surface 144 of the base 14 and the first magnet 172a installed on a mounting surface 102 of the optical image stabilizing carrier 10 facing the first coil 170a of the first side surface 144. In addition, the first optical image stabilizer driving unit 17a is provided with first and second yokes 174a and 176a corresponding to the first magnet 172a in a left and right pair and a first position detecting sensor 178a for detecting change of position of the first magnet 172a with respect to the first coil 170a.

The first and second yokes 174a and 176a are separately installed at one side of the bottom edge of the autofocus carrier 12 to configure an arrangement of a form one-to-one corresponding to each of the areas divided by the optical axis direction central axis line A1 of the first magnet 172a. Preferably, the first and second yokes 174a and 176a are arranged in equal size at positions symmetrical to each other with respect to the axis line A1.

Attractive forces of equal magnitude are applied between the first yoke 174a and the first magnet 172a and the second yoke 176a and the first magnet 172a arranged in a symmetrical form with respect to the axis line A1, and, accordingly, when the optical image stabilizer is driven, rotation of the optical image stabilizing carrier 10 in one direction on the XY plane is suppressed, and the optical image stabilizing carrier 10 may accurately return to the optical axis center point after the correction.

That is, since the first and second yokes 174a and 176a, which are installed separately to be correspondent to each of the areas divided by the optical axis direction central axis line of the first magnet 172a, generate an attractive force between the first and second yokes 174a and 176a and the first magnet 172a when the optical image stabilizing carrier 10 is driven to stabilize an optical image, the optical image stabilizing carrier 10 may perform a stable linear motion without rotation in a direction to which an optical image stabilization driving force is applied.

The first position detecting sensor 178a detects change of position of the first magnet 172a with respect to the first coil 170a. This is a change of magnetic field of the first magnet 172a, and correction for tremors may be precisely performed by recognizing a position of the optical image stabilizing carrier 10 with respect to the base 14 in real-time and performing a feedback control on the first optical image stabilizer driving unit 17a based on the value of the recognized position compared to the initial position.

The second optical image stabilizer driving unit 17b includes a second coil 170b installed on the second side surface 146 of the base 14 and the second magnet 172b installed on a mounting surface 104 of the optical image stabilizing carrier 10 facing the second coil 170b of the second side surface 146. In addition, the second optical image stabilizer driving unit 17b is provided with third and fourth yokes 174b and 176b corresponding to the second magnet 172b in a left and right pair and a second position detecting sensor 178b for detecting change of position of the second magnet 172b with respect to the second coil 170b (refer to FIG. 11 described below).

The third and fourth yokes 174b and 176b are separately installed at the other side of the bottom edge of the autofocus carrier 12 to configure an arrangement of a form one-to-one corresponding to each of the areas divided by the optical axis direction central axis line A2 of the second magnet 172b in the same manner as the first and second yokes 174a and 176a, and, accordingly, when the optical image stabilizer is driven, rotation of the optical image stabilizing carrier 10 in one direction on the XY plane is suppressed, and a restoration force is provided so that the optical image stabilizing carrier 10 may accurately return to the optical axis center point after the correction.

That is, since the third and fourth yokes 174b and 176b, which are installed separately to be correspondent to each of the areas divided by the optical axis direction central axis line of the second magnet 172b, generate an attractive force between the third and fourth yokes 174b and 176b and the second magnet 172b when the optical image stabilizing carrier 10 is driven to stabilize an optical image, the optical image stabilizing carrier 10 may perform a stable linear motion without rotation in a direction to which an optical image stabilization driving force is applied.

The second position detecting sensor 178b detects change of position of the second magnet 172b with respect to the second coil 170b. This is a change of magnetic field of the second magnet 172b, and correction for tremors may be precisely performed by recognizing a position of the optical image stabilizing carrier 10 with respect to the base 14 in real-time and performing a feedback control on the second optical image stabilizer driving unit 17b based on the value of the recognized position compared to the initial position.

Reference numeral 20 refers to an autofocus stopper for preventing Z-axis direction deviation and determining maximum stroke of the carriers 10 and 12 installed with an lens barrel 13 when autofocus is controlled, and reference numeral 22 refers to an optical image stabilizer stopper provided to limit Z-axis movement of the optical image stabilizing carrier 10 when the optical image stabilization is driven. In addition, reference numeral 179 refers to a substrate having a coil installed therein to configure the optical image stabilizer driving unit 17 and supplying power to the coil.

Although a configuration of providing the autofocus stopper 20 on the top of the base in an assembly type is shown in the figure as an example, the autofocus stopper 20 may be replaced by a step formed on a cover of a position corresponding to the autofocus stopper 20, and, in this case, it is preferable to attach a damper on the surface of the step so that a shock may be diminished when a carrier is touched.

In addition, reference symbols y1, y2 and y4 which are not described refer to back yokes respectively arranged on the rear surfaces of the substrate 166 of the autofocus driving unit 16 and the first and second magnets 172a and 172b of the first and second optical image stabilizer driving units 17a and 17b in order to increase driving efficiency when the autofocus and optical image stabilization are driven by concentrating electromagnetic fields.

Hereinafter, optical image stabilization performed by the optical image stabilizer driving unit of the above configuration is described.

Figure 10:
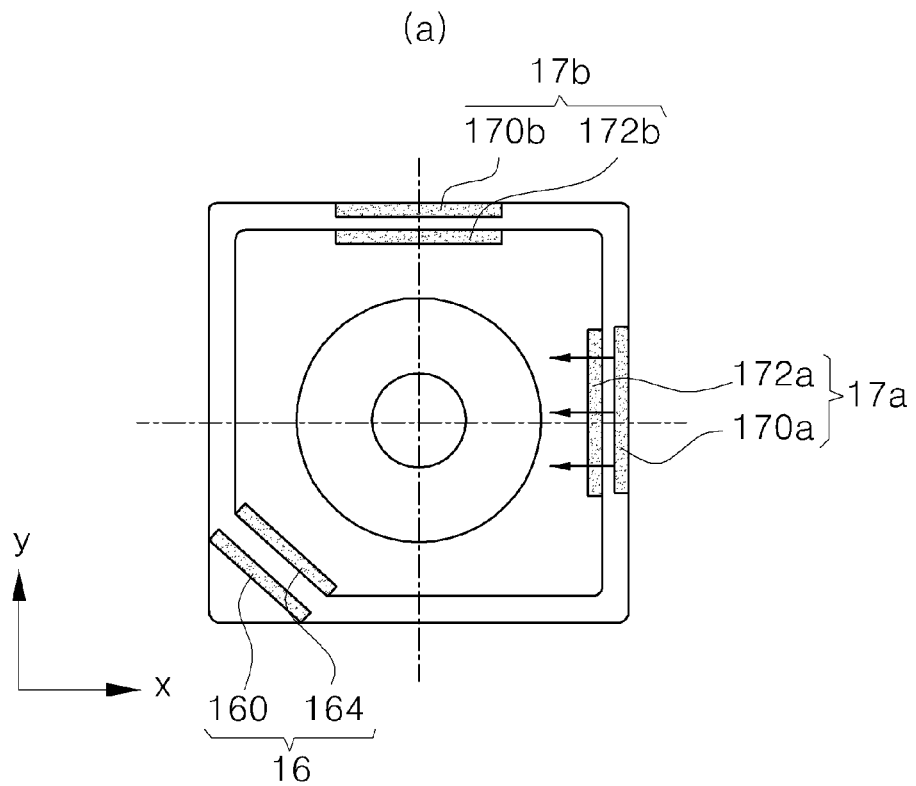
FIG. 10 is a view showing an operation state related to X-axis direction optical image stabilization of a camera lens module according to an embodiment of the present invention.
Figure 10:
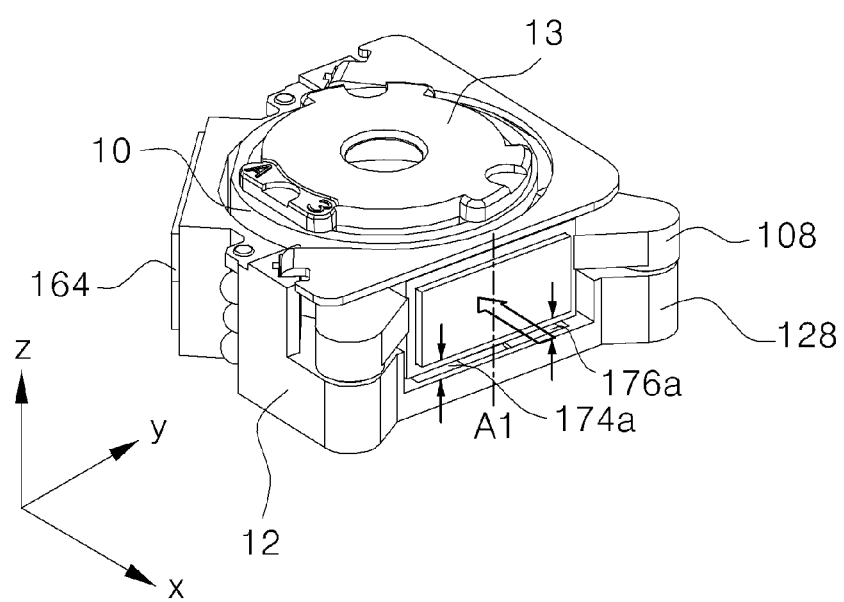

FIG. 10 is a view showing an operation state related to X-axis direction optical image stabilization of a camera lens module according to an embodiment of the present invention, in which FIG. 10(a) is a conceptual view schematically showing the operation principle of the first optical image stabilizer driving unit related to X-axis direction optical image stabilization, and FIG. 10(b) is an exploded perspective view of a major portion showing a relation between the first magnet and the first and second yokes when optical image stabilization is performed in the X-axis direction.

Referring to FIG. 10(a), in a steady state, i.e., when power is not input, the optical image stabilizing carrier 10 maintains an aligned state in which its center exactly corresponds to the optical axis without being skewed to one side with respect to the XY plane on the autofocus carrier 12 owing to the attractive force of the magnetic force generated by the first magnet 172a and the second magnet 172b toward the first coil 170a and second coil 170b.

If power is supplied to the first coil 170a through the substrate 179 of the optical image stabilizer driving unit 17 in a steady state, a force for advancing and retreating the optical image stabilizing carrier 10 in the X-axis direction is generated by an interaction between the electric field of the first coil 170a and the magnetic field of the first magnet 172a, and this force acts as a force for moving the optical image stabilizing carrier 10 accommodating the lens barrel 13 on the XY plane in correspondence to X-axis direction tremors.

In the process of correcting X-axis direction tremors, the first position detecting sensor 178a recognizes a position of the optical image stabilizing carrier 10 with respect to the base 14 in real-time by detecting change of position of the first magnet 172a with respect to the first coil 170a, and since a feedback control for the first optical image stabilizer driving unit 17a is performed based on the value of the recognized position with respect to the initial position, correction for tremors is precisely performed.

In correcting tremors of the X-axis direction, since the first and second yokes 174a and 176a are separately installed to configure an arrangement of a form one-to-one corresponding to each of the areas divided by the optical axis direction central axis line of the first magnet 172a, attractive forces of equal magnitude are applied to the two divided areas as shown in FIG. 10(b), and, accordingly, the optical image stabilizing carrier 10 performs a stable linear motion without rotation.

Figure 11:
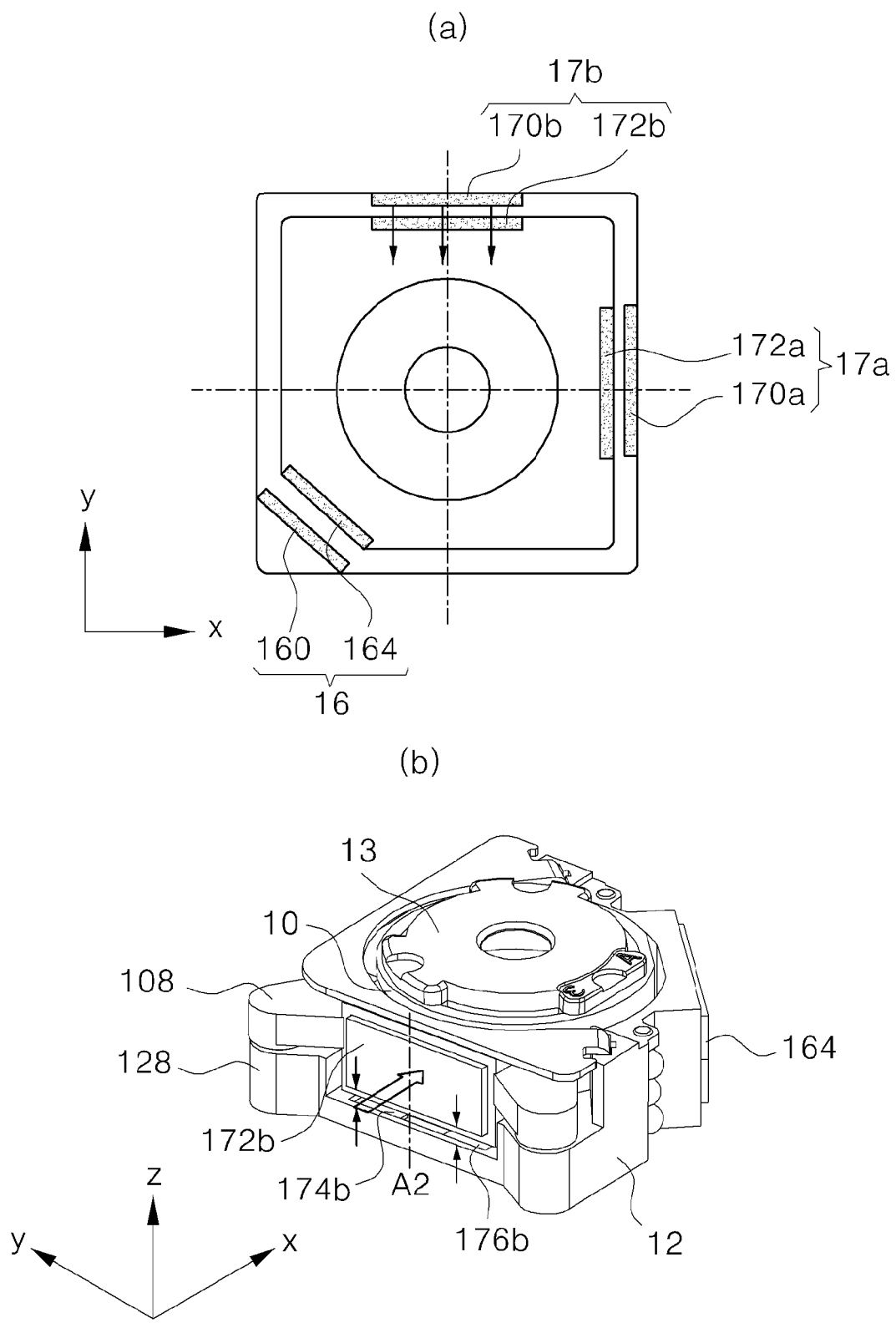
FIG. 11 is a view showing an operation state related to Y-axis direction optical image stabilization of a camera lens module according to an embodiment of the present invention.

FIG. 11 is a view showing an operation state related to Y-axis direction optical image stabilization of a camera lens module according to an embodiment of the present invention, in which FIG. 11(a) is a conceptual view schematically showing the operation principle of the second optical image stabilizer driving unit related to Y-axis direction optical image stabilization, and FIG. 11(b) is an exploded perspective view of a major portion showing a relation between the second magnet and the third and fourth yokes when optical image stabilization is performed in the Y-axis direction.

On the contrary to FIG. 10, if power is applied to the second coil 170b through the substrate 179 of the optical image stabilizer driving unit 17 in a steady state, a force for advancing and retreating the optical image stabilizing carrier 10 in the Y-axis direction is generated by an interaction between the electric field of the second coil 170b and the magnetic field of the second magnet 172b. At this point, this force acts as a force which enables the optical image stabilizing carrier 10 accommodating the lens barrel 13 to counteract Y-axis direction tremors on the XY plane.

In the same way, in the process of correcting Y-axis direction tremors, the second position detecting sensor 178b recognizes a position of the optical image stabilizing carrier 10 with respect to the base 14 in real-time by detecting change of position of the second magnet 172b with respect to the second coil 170b, and since a feedback control for the second optical image stabilizer driving unit 17b is performed based on the value of the recognized position with respect to the initial position, correction for tremors is precisely performed.

Also in correcting tremors of the Y-axis direction, since the third and fourth yokes 174b and 176b are separately installed to configure an arrangement of a form one-to-one corresponding to each of the areas divided by the optical axis direction central axis line of the second magnet 172b, attractive forces of equal magnitude are applied to the two divided areas as shown in FIG. 11(b), and, accordingly, the optical image stabilizing carrier 10 performs a stable linear motion without rotation.

Of course, although it is not shown in detail through the figures, in driving actual optical image stabilization, forces of different magnitudes and directions are simultaneously applied in the X-axis and Y-axis directions by the first optical image stabilizer driving unit 17 and the second optical image stabilizer driving unit 17, and since the optical image stabilizing carrier 10 moves in a direction of synthesizing the vector components of the X-axis and the Y-axis generated by the first and second optical image stabilizer driving units 17, the tremors are corrected.

According to the camera lens module according to an embodiment of the present invention as described above, since the camera lens module has a compact structure added with an autofocus and an optical image stabilizer by efficiently utilizing free spaces (free spaces at the corners) formed between a mover (an optical image stabilizing carrier and an autofocus carrier having a lens barrel mounted thereon) and a stator (a base), both miniaturization and functionality of a product may be satisfied.

In addition, owing to a plurality of yokes separately arranged in correspondence to optical image stabilizing magnets (the first and second magnets), malfunctions of the mover, such as exceeding a range of optical image stabilization or unnecessary rotation, are suppressed in performing the optical image stabilization, and, accordingly, a highly satisfied camera lens module with high accuracy and preciseness can be provided in performing the optical image stabilization.

Furthermore, since a configuration of accommodating carriers installed with a lens barrel in a base is constructed, optical axis alignment (active-align) between the lens barrel and the image sensor of the image sensor module assembled in the base is allowed only by adjusting an assembly angle of the image sensor module with respect to the base in the process of assembling a camera lens module, and thus it is advantageous in that a troublesome optical axis alignment process is not separately required.

Although a configuration of mounting an optical image stabilizing carrier on an autofocus carrier is shown and described as an example, on the contrary, a modification of installing the optical image stabilizing carrier 10 on the base 14 and mounting the autofocus carrier 12 on the optical image stabilizing carrier 10 may also be possible, and, accordingly, such a modification may also be included in the scope of the present invention.

In the case of such a modification, the rolling unit 15 and the first to fourth yokes 176a, 174a, 176b and 174b applied to the embodiment described above may be mounted between the optical image stabilizing carrier 10 and the base 14 to provide a function of driving optical image stabilization and preventing excessive rotation of the optical image stabilizing carrier 10 in the same manner as described above.

In this case, a penetration hole is formed in the optical image stabilizing carrier 10 of a portion on which the autofocus driving unit is mounted, and the autofocus magnet 164 and the autofocus coil 160 applied to the embodiment may be configured in an arrangement facing each other with the intervention of the penetration hole, and when the penetration hole does not exist, autofocus driving may be implemented by arranging the autofocus driving unit between the optical image stabilizing carrier 10 and the autofocus carrier 12 and applying power to a coil arranged in the optical image stabilizing carrier.

According the camera lens module according to an embodiment of the present invention, since the camera lens module has a compact structure added with an autofocus and an optical image stabilizer by efficiently utilizing free spaces (free spaces at the corners) formed between a mover (an optical image stabilizing carrier and an autofocus carrier having a lens barrel mounted thereon) and a stator (a base), both miniaturization and functionality of a product may be satisfied.

In addition, owing to a plurality of yokes separately arranged in correspondence to optical image stabilizing magnets (the first and second magnets), malfunctions of the mover such as exceeding a range of optical image stabilization or unnecessary rotation are suppressed in performing the optical image stabilization, and, accordingly, a highly satisfied camera lens module with high accuracy and preciseness in performing the optical image stabilization can be provided.

Furthermore, since a configuration of accommodating carriers installed with a lens barrel in a base is constructed, optical axis alignment (active-align) between the lens barrel and the image sensor of the image sensor module assembled in the base is allowed only by adjusting an assembly angle of the image sensor module with respect to the base in the process of assembling a camera lens module, and thus it is advantageous in that a troublesome optical axis alignment process is not separately required.

The camera lens module of the present invention may be mounted on a portable mobile device.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A camera lens module, comprising:
an optical image stabilizing carrier configured to accommodate a lens barrel and driven by an optical image stabilizer driving unit;
a rolling unit configured to support a plane motion of the optical image stabilizing carrier to be orthogonal to an optical axis;
an autofocus carrier configured to mount the optical image stabilizing carrier to advance and retreat along the optical axis at a side opposite to the optical image stabilizing carrier;
a base including side surfaces configured to wrap the autofocus carrier and the optical image stabilizing carrier,
wherein the optical image stabilizer driving unit is placed between the base and the optical image stabilizing carrier and an autofocus driving unit for driving the autofocus carrier is placed between the autofocus carrier and the base,
wherein the rolling unit further includes:
two or more balls placed between the optical image stabilizing carrier and the autofocus carrier to support the optical image stabilizing carrier so that the optical image stabilizing carrier moves in a direction vertical to the optical axis;
two or more supporting pieces respectively provided at a corner of the autofocus carrier in one piece and having a concave accommodating surface formed on a top surface thereof;
two or more seating pieces formed on a circumference of the optical image stabilizing carrier in a projected form to be correspondent to the supporting pieces and respectively having a concave accommodating surface formed on a bottom surface thereof; and
wherein the balls are interposed between the supporting piece and the seating piece so that a first portion and another portion of the balls are respectively accommodated on the accommodating surfaces of the supporting piece and the seating piece, and
wherein the supporting piece and the seating piece are arranged to be vertically stacked in an optical axis direction to form a single shake suppressing piece, and two or more concave surfaces shaped so that the shake suppressing piece is inserted therein are provided along the optical axis direction inside a corner of the base.

2. The camera lens module according to claim 1,
wherein the autofocus driving unit includes:
an autofocus magnet installed on an outer surface of the autofocus carrier; and
an autofocus coil installed at the base to face the autofocus magnet.

3. The camera lens module according to claim 2,
wherein the autofocus driving unit includes:
optical axis guide devices respectively including a ball and arranged at the base corresponding to both left and right sides of the autofocus magnet; and
a back yoke arranged on a rear side of the autofocus magnet.

4. The camera lens module according to claim 1,
wherein the optical image stabilizer driving unit includes:
a coil installed on the base; and
a magnet installed on the optical image stabilizing carrier to face the coil.

5. The camera lens module according to claim 1,
further comprising an image sensor module mounted on a bottom of the base, wherein the image sensor module includes:
an infrared filter arranged at a center of an opening of the bottom unit of the base;
a filter base on which the infrared filter is installed; and
a substrate arranged under the infrared filter and having an image sensor installed thereto.

* * * * *